US008922051B2

(12) United States Patent
Romberger et al.

(10) Patent No.: US 8,922,051 B2
(45) Date of Patent: Dec. 30, 2014

(54) CURRENT CONTROL MODULE FOR A VEHICLE

(71) Applicants: Ryan Robert Romberger, Jersey Shore, PA (US); Nedim Hamzic, Falconer, NY (US)

(72) Inventors: Ryan Robert Romberger, Jersey Shore, PA (US); Nedim Hamzic, Falconer, NY (US)

(73) Assignee: Truck-Lite Co., LLC, Falconer, NY (US)

( * ) Notice: Subject to any disclaimer, the term of this patent is extended or adjusted under 35 U.S.C. 154(b) by 106 days.

(21) Appl. No.: 13/842,857

(22) Filed: Mar. 15, 2013

(65) Prior Publication Data
US 2014/0265840 A1    Sep. 18, 2014

(51) Int. Cl.
*B60L 1/14*    (2006.01)
*B60Q 11/00*    (2006.01)

(52) U.S. Cl.
CPC .................. *B60Q 11/005* (2013.01)
USPC ............................ 307/10.8; 315/77

(58) Field of Classification Search
USPC ................... 315/77; 307/10.1, 10.8
See application file for complete search history.

(56) References Cited

U.S. PATENT DOCUMENTS

| | | | |
|---|---|---|---|
| 5,548,162 A * | 8/1996 | Ito et al. ..................... | 307/10.1 |
| 6,011,416 A | 1/2000 | Mizuno et al. | |
| 6,153,980 A | 11/2000 | Marshall et al. | |
| 6,450,833 B1 | 9/2002 | Brown, Jr. et al. | |
| 6,525,654 B1 | 2/2003 | Siggers | |
| 6,667,623 B2 | 12/2003 | Bourgault et al. | |
| 6,836,081 B2 | 12/2004 | Swanson et al. | |
| 7,327,051 B2 | 2/2008 | Ito et al. | |
| 8,198,818 B2 * | 6/2012 | Matsui et al. ................... | 315/77 |
| 8,334,662 B2 | 12/2012 | Jin et al. | |
| 8,339,046 B2 * | 12/2012 | Kasaba et al. ................. | 315/80 |
| 2002/0043964 A1* | 4/2002 | Saito et al. ..................... | 323/282 |
| 2005/0168072 A1* | 8/2005 | Saito et al. ................... | 307/10.1 |
| 2011/0169424 A1 | 7/2011 | Aboulnaga | |
| 2014/0001730 A1* | 1/2014 | Kulkarni et al. .............. | 280/422 |

* cited by examiner

*Primary Examiner* — Thuy Vinh Tran
(74) *Attorney, Agent, or Firm* — The Bilicki Law Firm, P.C.; Byron A. Bilicki; Rebecca M.K. Tapscott

(57) ABSTRACT

A current control module is used in a vehicle having a marker or tail lamp, a stop lamp, a left turn signal and a right turn signal. The current control module includes a circuit board and at least one wire coupled to the circuit board, the at least one wire corresponding to one of the marker or tail lamp, stop lamp, left turn signal or right turn signal. The current monitoring circuit includes a current sense resistor, a current sense amplifier, a voltage comparator, and a transistor coupled to the voltage comparator for turning off and preventing current from being delivered to the at least one wire corresponding to one of the marker or tail lamp, stop lamp, left turn signal or right turn signal.

22 Claims, 13 Drawing Sheets

CURRENT CONTROL MODULE FOR A VEHICLE

FIELD OF THE INVENTION

The present application is directed to a method and apparatus for monitoring current in a vehicle having a marker or tail lamp, a stop lamp, a left turn signal and a right turn signal.

BRIEF SUMMARY

A current control module is used in a vehicle having a marker or tail lamp, a stop lamp, a left turn signal and a right turn signal. The current control module includes a circuit board and at least one wire coupled to the circuit board, the at least one wire corresponding to one of the marker or tail lamp, stop lamp, left turn signal or right turn signal. The current monitoring circuit includes a current sense resistor, a current sense amplifier, a voltage comparator, and a transistor coupled to the voltage comparator for turning off and preventing current from being delivered to the at least one wire corresponding to one of the marker or tail lamp, stop lamp, left turn signal or right turn signal.

DETAILED DESCRIPTION OF THE DRAWINGS

In general, the amount of wire needed within a vehicle lighting current control module is a function of current draw, measured in amperes. High current draw requires a larger diameter wire with a larger cross sectional area than a lower current draw, which only requires a smaller diameter wire with a smaller cross sectional area. Wire diameter and cross sectional area are measured in gauge. Incandescent lamps have a high current draw and require a larger gauge wire. In contrast, LED lamps have a lower current draw and require a smaller gauge wire. Current control module 10 includes a current monitoring circuit that protects wiring when a current overdraw situation exists and, thus, enables current control module 10 to safely use smaller gauge wire with both LED and incandescent lighting applications.

Figure 1:
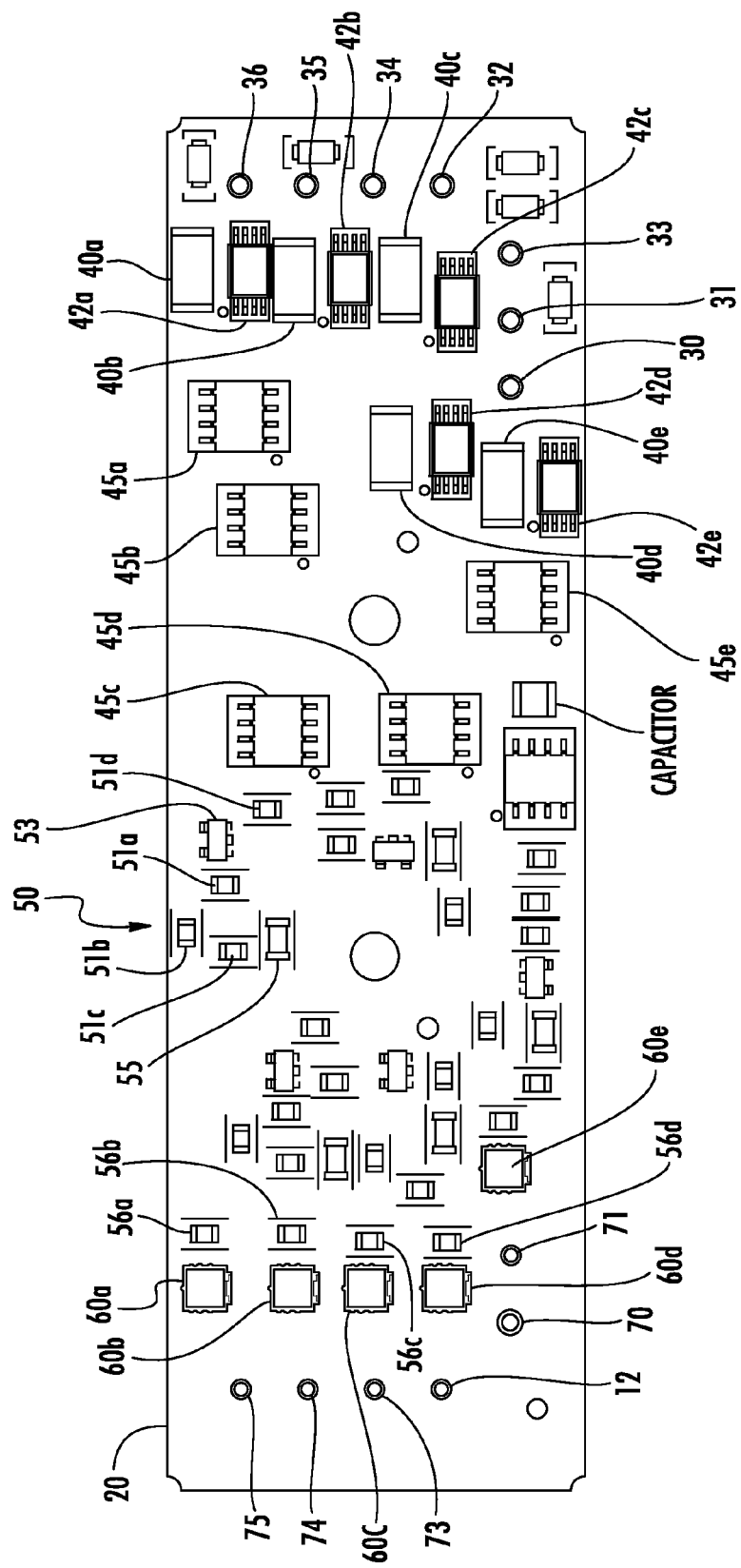
FIG. 1 is a view of a first side circuit board of a current control module having a current monitoring circuit.

FIG. 1 illustrates a current control module 10 including circuit board 20 having a plurality of electrical components that make up a plurality of current monitoring circuits. The circuitry may be located on a plurality of platforms including, but not limited to a circuit board. Such a circuit board provides connections upon which electrical wires may be attached, that may contain a current sense amplifier, and may contain a reference voltage component.

A plurality of current input wires 30-36 draw current to circuit board 20 from the current source, such as a battery or alternator. Each input wire 30-36 is connected individually to circuit board 20. In the embodiment shown, input wire 30 is a continuous power source wire. Each of input wires 31 and 32 is a marker, clearance, tail or license plate lamp wire. Input wire 33 is a ground wire, input wire 34 is a left turn signal wire, input wire 35 is a stop lamp wire, and input wire 36 is a right turn signal wire. However, other configurations may be used. Also shown in FIG. 1 is a plurality of current sense resistors, each of which is indicated as 40a-40e, and a plurality of current sense amplifiers, indicated at 42a-42e. A plurality of differential voltage comparators, 45a-45e, are also coupled to circuit board 20.

Circuit board 20 also includes a plurality of voltage divider resistor networks, one of which is indicated at 50. Each voltage divider resistor network includes a plurality of resistors, such as resistors 51a-51d. A plurality of transistors and capacitors, such as transistor 53 and capacitor 55, may also be included on circuit board 20. An additional plurality of resistors, 56a-56d, may also be provided. Further, a plurality of MOFSETs (metal-oxide-semiconductor field-effect transistors), indicated at 60a-60d, is also provided on circuit board 20. An additional capacitor 62, which may be a ceramic capacitor, may also be included. An additional regulator 63, such as a 5V regulator, is provided to stabilize a reference voltage to ensure that the reference voltage does not change even though the input voltage can change.

A plurality of current output wires 70-75 are provided to convey current to lighting elements, such as a stop light or tail light. In particular, each output wire 70-75 is connected individually to circuit board 20. In the embodiment shown, output wire 70 is a ground wire. Each of output wires 71 and 72 is a marker, clearance, tail or license plate lamp wire. Output wire 73 is a left turn signal wire, output wire 74 is a stop lamp wire, and output wire 75 is a right turn signal wire. However, other configurations may be used. Alternately, a different set of electrical components may be attached to perform the current sense amplifier functionally.

Figure 2:
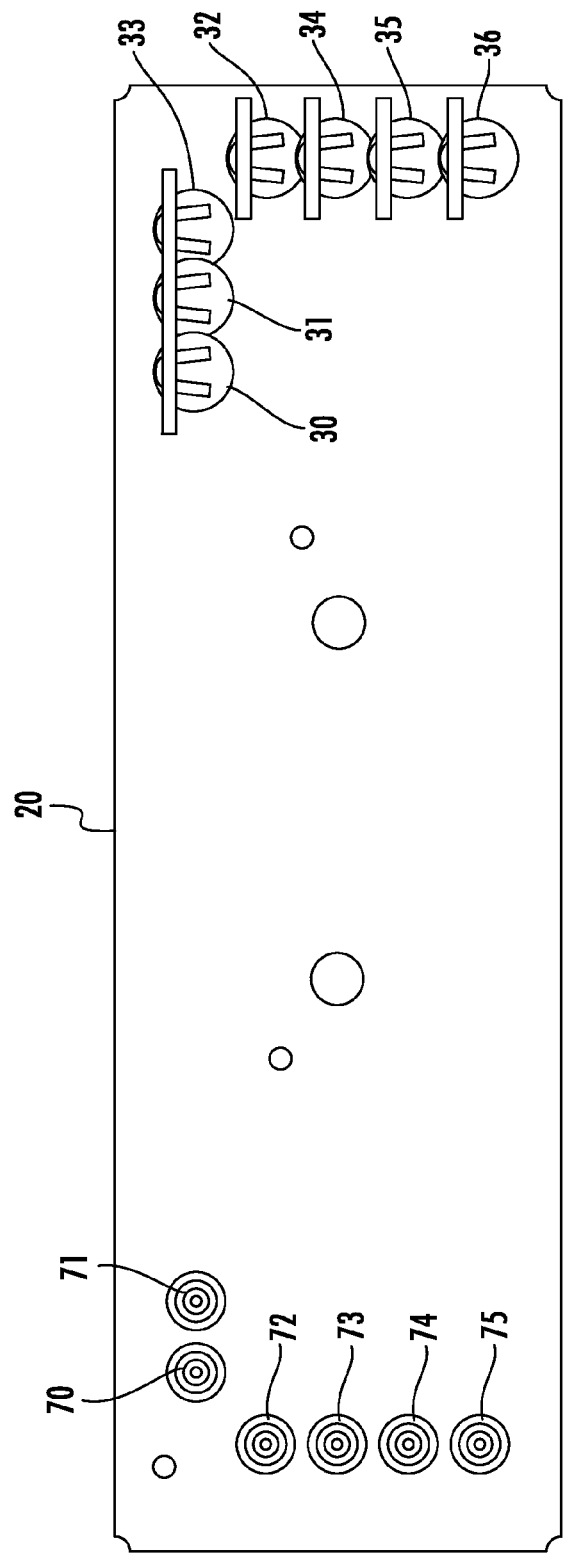
FIG. 2 is a bottom view of a circuit board.
Figure 3:
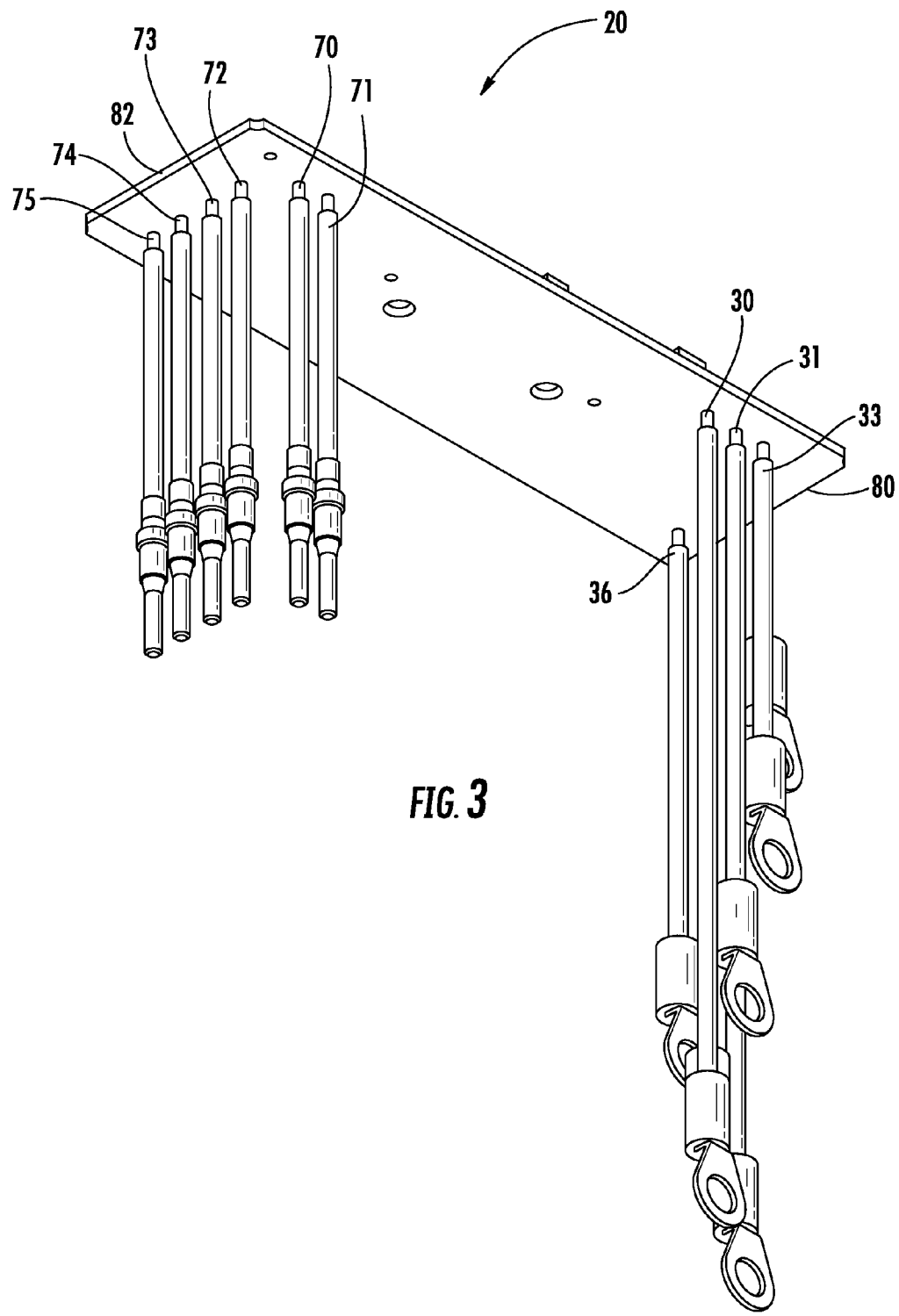
FIG. 3 is a perspective view of a circuit board.

FIGS. 2 and 3 illustrate a bottom view and a perspective view of circuit board 20, respectively. In the embodiment shown, plurality of current input wires 30-36 are attached to a first end 80 of circuit board 20 for drawing current to circuit board 20 from the current source, such as a battery or alternator. As discussed above, input wire 30 is a continuous power source wire. Each of input wires 31 and 32 is a marker, clearance, tail or license plate lamp wire. Input wire 33 is a ground wire, input wire 34 is a left turn signal wire, input wire 35 is a stop lamp wire, and input wire 36 is a right turn signal wire. In addition, plurality of current output wires 70-75 are attached to a second end 82 of circuit board 20 current to lighting elements, such as a stop light or tail light. As discussed above, output wire 70 is a ground wire. Each of output wires 71 and 72 is a marker, clearance, tail or license plate lamp wire. Output wire 73 is a left turn signal wire, output wire 74 is a stop lamp wire, and output wire 75 is a right turn signal wire. A plurality of indicators, such as LED indicator lights (not shown), may be included on a bottom surface of circuit board 20 to notify a user of a fault condition.

Figure 4:
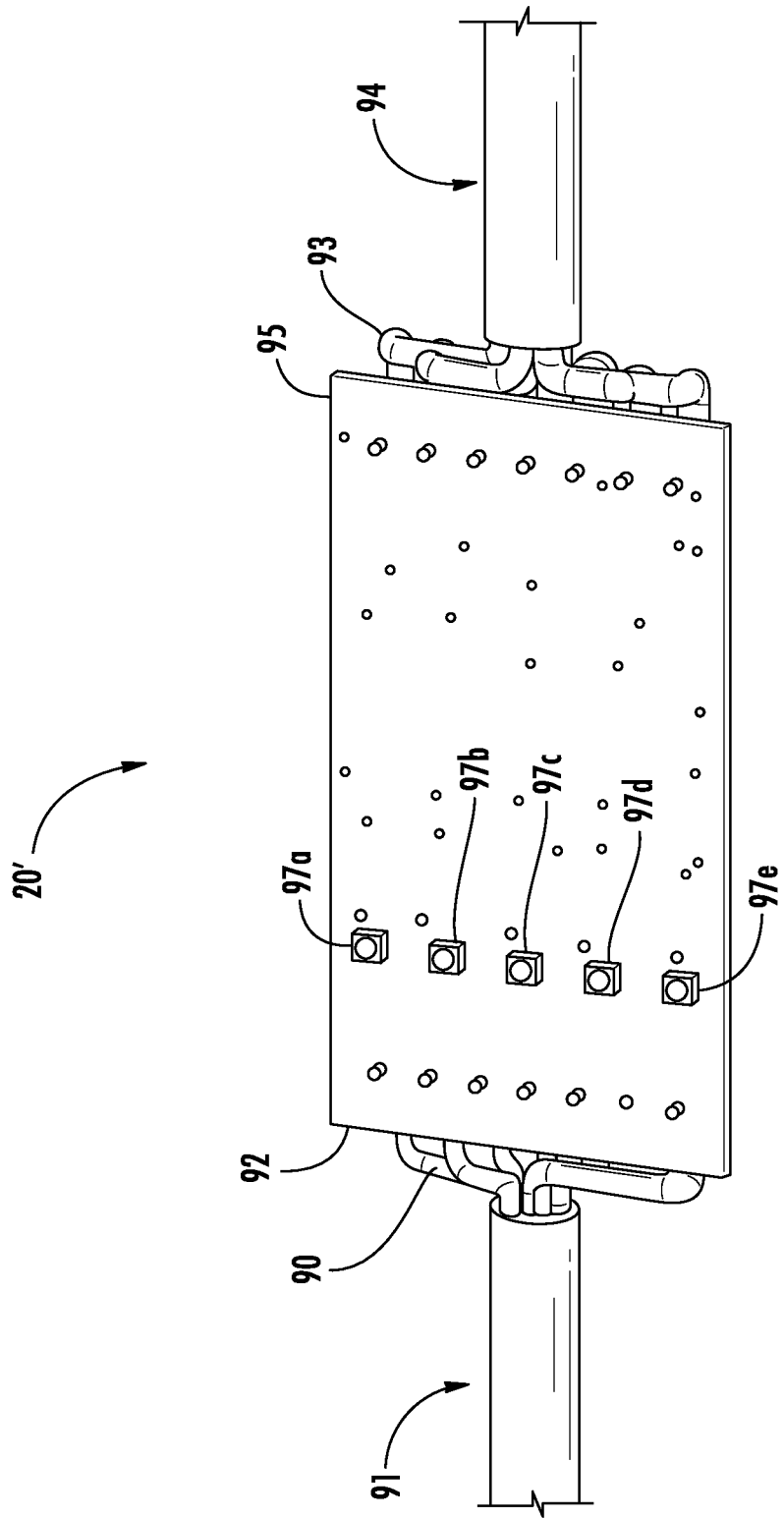
FIG. 4 is a bottom view of an alternate embodiment of the circuit board having LED indicator lights.

FIG. 4 illustrates an alternate embodiment of a circuit board 20' having a current monitoring circuit. In particular, input wires, generally indicated at 90, are surrounded by a cable 91 and attach to circuit board 20' on a current input end 92 of circuit board 20'. Output wires, generally indicated at 93, are surrounded by cable 94 and attach to circuit board 20' on a current output end 95 of circuit board 20'. A plurality of LED indicator lights, 97a-97e, are also shown attached to circuit board 20 for indicated when a fault has occurred in at least one of a marker or tail lamp, a stop lamp, a left turn signal and a right turn signal.

In particular, FIG. 4 features an embodiment wherein LED indicator lights 97a-97e indicate the occurrence of a current overage. Circuit board 20 may contain at least one LED indicator light. In the embodiment shown, LED indicator lights 97a-97e are presented in a column arrangement, with the series of indicator LED's arranged in a column parallel to input end 92 of circuit board 20. The column of indicator LED's may also be arranged in a column running perpendicular to input end 92. The indicator LED's may be arranged in any pattern and may also be on different faces such as the front face and the rear face of circuit board 20.

LED indicator lights 97a-97e represent a plurality of different lighting devices, including, but not limited to head lamps, rear lamps, brake lights, marker tail lights, right and left turn signals and the like. The specific number of vehicle lamps and location on a vehicle body or trailer are spelled out in the Federal Motor Vehicle Safety Standards, specifically FMVSS0108. The lamps required include one front marker, one side marker or turn, one rear tracking, three rear identification, two stop/tail, one right hand turn/tail, one left hand turn/tail, and one license plate lamp. The present application accommodates all the lamps mandated by the FMVSS0108 legal standard.

LED indicator lights 97a-97e illuminate when a circuit has encountered an overload and may remain illuminated until the amperage overload is reduced. In one embodiment, LED indicator lights 97a-97e remain illuminated until a corresponding lamp is disconnected. Alternately, LED indicator lights 97a-97e may remain on for a specific amount of time, after which LED indicator lights 97a-97e shut off automatically. LED indicator lights 97a-97e may also be set to blink or flash, go on and off intermittently or perform any such similar pattern of illumination that may call attention to the occurrence of the over voltage condition.

While the embodiment shown in FIG. 4 shows the wires exiting from a jacketed cable and being attached to either end of a square circuit board, alternate embodiments could include a different wire entry/exit pattern and board shape to meet specific mounting or size constraints. The individual wires do not need to be contained in a cable jacket or overwrap to bind them together.

Figure 5:
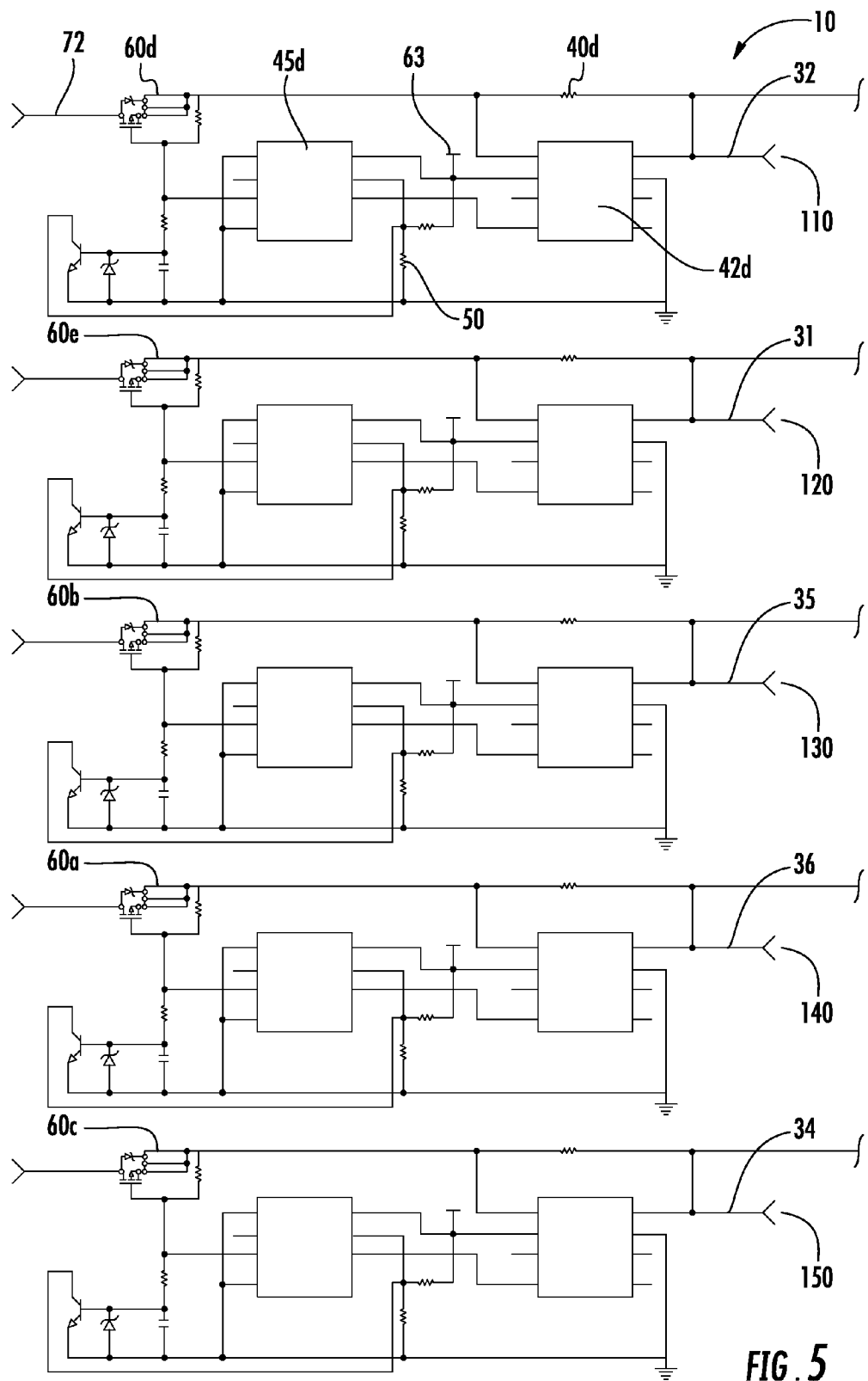
FIG. 5 is a circuit diagram of a current control module.

FIG. 5 is a circuit diagram of a current control module 10 including a plurality of current monitoring circuits, 110, 120, 130, 140, and 150, each corresponding to a vehicle lighting device. An input wire 31, 32, 34, 35 or 36 is associated with each current monitoring circuit, as illustrated in FIG. 5. In particular, each of current monitoring circuits 110, 120 and input wires 32, 31, respectively, corresponds to at least one of a marker, clearance, tail and license lamp. Current monitoring circuit 130 and input wire 35 correspond to a stop lamp. Current monitoring circuit 140 and input wire 36 correspond to a right hand turn signal and current monitoring circuit 150 and input wire 34 corresponds to a left hand turn signal.

Current control module 10 controls the amount of current that is being delivered to a load, rather than the amount of voltage. Each of the current monitoring circuits functions in a similar manner, thus, it should be clear that the following description applies to each of current monitoring circuits. Input wire 32, which corresponds to a marker, clearance, tail and/or license lamp allows a maximum load, for example, 0.426 A, and any higher value would trip circuit 110 and a MOSFET 60d would turn off. Thus, current is prevented from being delivered to a load (i.e. the marker, clearance, tail and/or license lamp). Input wires 31 and 35 are configured such that a maximum load is 0.690 A. Thus, any value higher than 0.690 A would trip circuits 120 and 130 and cause MOFSETS 60e and 60b to turn off and preventing current from being delivered to the corresponding loads. Further, input wires 36 and 34 are configured such that a maximum load is 0.865 A and any higher value would trip circuits 140 and 150 and cause MOFSETS 60a and 60c to turn off Thus, current would be prevented from being delivered to the corresponding loads, i.e. right and left hand turn signals.

Thus, when the current to a load exceeds the allowable amount for any of the input wires, a corresponding P-MOSFET on each wire shuts off very fast and prevents current from going to the load. When a P-MOSFET device is tripped due to high current being delivered to a load, only way the PMOSFET 111a-111e can be turned on again is by removing the excessive load from the corresponding wire and turning the power off to the corresponding line with high current draw. When the high current load is removed and power re-applied the PMOSFET engages again and current may be delivered to the load as long as the load is nominal and not excessive.

The present explanation is specific to current monitoring circuit 110 and input wire 32, however, each of wires 31, 35, 36 and 34 have the same operation process. Current on wire 32 is monitored across a current sense resistor 40c that is present on wire 32. The voltage drop across current sense resistor 40d is fed into current sense amplifier 42d that produces an output voltage that is a product of amplifier gain and voltage drop across current sense resistor 40d. The amplifier voltage output is then fed to differential voltage comparator 45d that compares amplifier voltage to a reference voltage that is determined through voltage divider network 50. Differential voltage comparator 45d continually monitors the voltage of current sense amplifier 42d and as soon as the amplifier output voltage exceeds the reference voltage of differential voltage comparator 45d, then the comparator output would turn off and, thus, PMOSFET 60d would turn off preventing current from being delivered to a load through output wire 72. The comparator voltage reference is configured through voltage divider resistor network 50 and it can be configured for more or less current depending on customer need. The reference voltage is stable due to a 5V regulator 63, which ensures that reference voltage does not change even though the input voltage can change.

In particular, current sense amplifier 42d, which may also be called a current shunt amplifier, produces an output a voltage proportional to the input voltage. Current sense amplifier 42d uses current-sense resistor 40d to convert the input current to a small voltage called a sense voltage. The small voltage may be amplified by current-sense amplifier 42d. Current sense amplifier 42d may be employed to measure current flowing in a single direction, or employed in a bidirectional amplifiers which can measure current flow in both directions through current sense resistor 40d. Current sense amplifier 42d may be of many varieties including, but not limited to, single polarity low side, bipolar low side or high side switching. In addition, current sense amplifier 42d may measure the actual current draw across a resistor. The actual voltage is then calculated from the current draw across the resistor and compared to a reference voltage.

A reference voltage component, such as Voltage divider network 50, generates a reference voltage which is used for amperage comparison. The source of the reference voltage may be located within the differential amplifier. The reference voltage source may be received from an outside source. The reference may be preset into the resistor, into the circuitry, into any other electrical components or into a combination of such elements. Alternately, the reference voltage may be changed manually. The reference voltage may also be set to change according to a predetermined set pattern. The reference voltage may also change automatically through operation of current sense amplifier 42$d$ in response to operational conditions such as, but not limited to, weather, engine heat, electrical load demands and the like. The actual voltage is compared to the reference voltage. If the actual voltage exceeds the reference voltage, a switch is opened, the power goes to ground, the circuit is grounded, and the current will cease to flow through the now open circuit. This protects the wiring. While the actual voltage is lower than or equal to the reference voltage, the circuit remains closed and the current continues to flow uninterrupted.

The comparison between the actual voltage and the reference voltage is performed by differential voltage comparator 45$d$. A differential amplifier amplifies the difference between two signals. In general, a differential amplifier receives two input signals, where one signal is an inverted input and the other signal is a non-inverted input. An output signal will be in phase with the non-inverted signal. The output signal will be 180 degrees out of phase with the inverted signal. One signal may be an input signal from the current or voltage to be measured. The two input signals are compared against each other using an operation such as addition, subtraction, multiplication, or division to determine the difference in values between the two input signals. The difference between the input values will be output and amplified. Should both input signals be of the same magnitude and polarity, then the difference will be zero and the signals can be considered to be identical. If the two input values have the same magnitude and opposite polarity, then both input signals are added together and the output value is double one of the input signals.

Differential voltage comparator 45$d$ operating in this capacity can determine the difference between the voltage being used by a vehicle lighting system and a pre-determined standard reference voltage. Should the vehicle lighting voltage be less than the pre-determined standard, the difference should be greater than zero. Should the vehicle lighting voltage be greater than the per-determined standard, the difference should be negative, indicating that the circuit should be opened to prevent damage to the circuit in general and to the LED lighting in particular.

Figure 6:
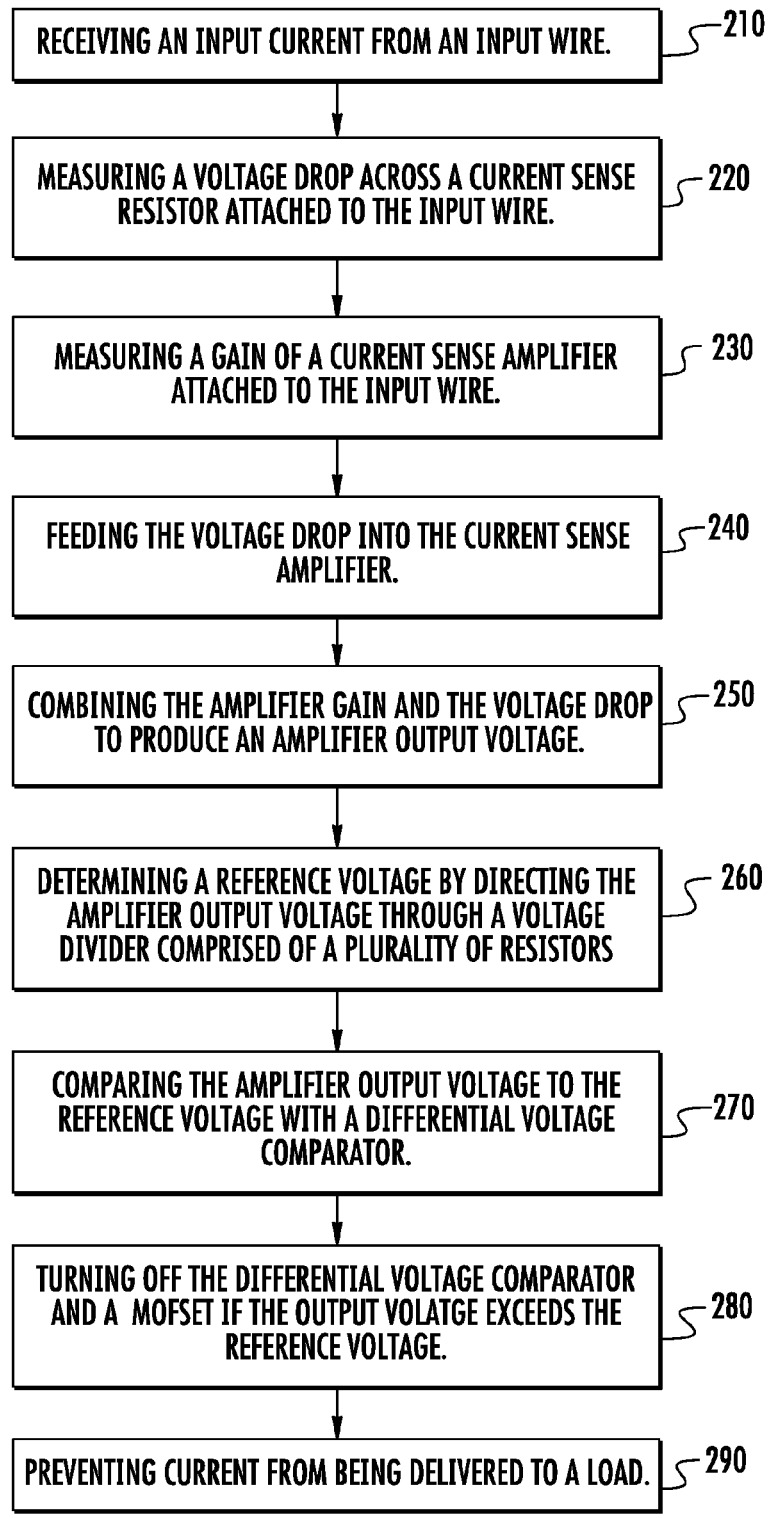
FIG. 6 is a flow chart of a method for controlling current.

FIG. 6 is a flow chart illustrating the operation of one current monitoring circuit of current sensing module 10. As indicated at 210, an input current is initially received from an input wire coupled a power source. A voltage drop is the measured across a current sense resistor connected to the input wire as indicated by 220. In step 230, the gain a current sense amplifier attached to the input wire is measured. The voltage drop is then fed into the current sense amplifier in step 240. As indicated at 250, the amplifier gain and the voltage drop are combined to produce an amplifier output voltage. In step 260, a reference voltage is derived by directing the amplifier output voltage through a voltage divider network. Step 270 includes comparing the amplifier output voltage to a reference voltage with a differential voltage comparator. Step 280 includes turning off the differential voltage comparator and a MOFSET when the output voltage exceeds the reference voltage. Further, as indicated at 290, current is prevented from being delivered to a corresponding marker or tail lamp, stop lamp, left turn signal or right turn signal when the MOFSET is turned off.

Figure 7:
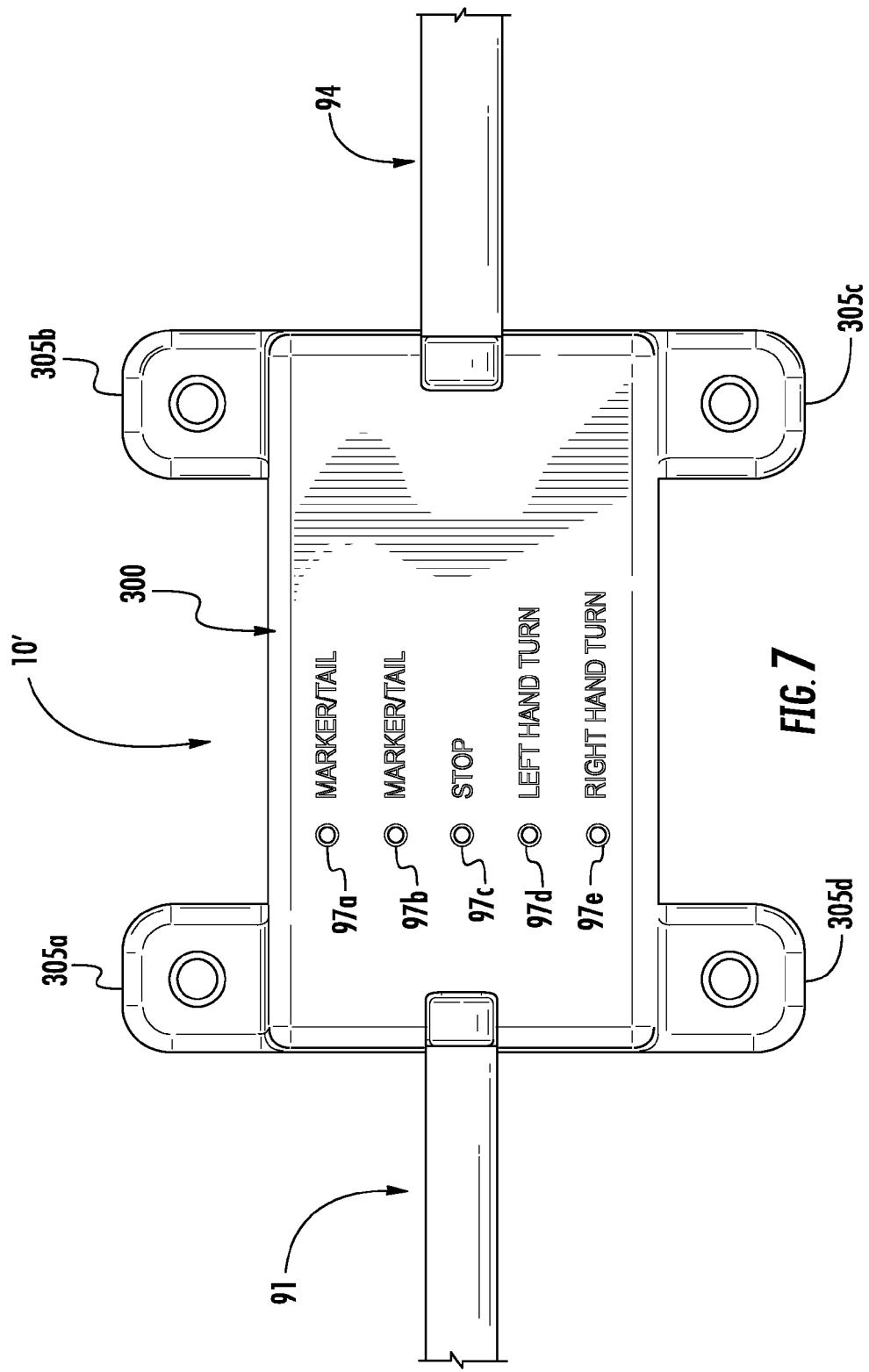
FIG. 7 illustrates a front view of a current control module having over molding material.

FIG. 7 is a front view of the current control module 10' having over molding material. The circuitry is covered or over molded with a material such as, but not limited to, MacroMelt material that is used in Truck-Lite's Model 36 flex-lamps. The individual wires are completely covered with the over molding material, creating a sealed cover 300 that will withstand environmental exposure. The wires are covered by cables 91 and 94 which may enter an over-molded cover 300 through an opening within cover 300. Cables 91, 94 and cover 300 lie flush together such that substantially all portions of the wires and circuit board are encapsulated. Over-molded current control module 10' may be mounted on the exterior of a truck body, chassis, or trailer and is sealed to protect circuit board 20 and the electrical components from moisture and other weather related elements.

LED indicator lights, 97$a$-97$e$, may be arranged in a substantially columnar order. The individual indicator LEDs may be accompanied by a label, such as series of symbols which indicate the nature of each individual lamp represented by each indicator LED. The label may comprise, but are not limited to, letters, words, icons, pictures, dots, dashes and the like. When the label is comprised of letters or words, such symbols may be of any language such as, but not limited to, English, Spanish, German, French, Chinese, Japanese, Russian, Italian, or any language spoken where speaker of such a language drive or employ at least one automotive vehicle. The label may be located to the left of the indicator LED, to the right of the indicator LED, above of the indicator LED, below of the indicator LED, parallel to of the indicator LED, diagonal to the of the indicator LED, or the label may be at any orientation relative to the indicator LED. Each individual LED may be accompanied by a label, or only a portion of the LEDs may be accompanied by a label, or only one LED may be accompanied by a label. Alternately, none of the LEDs may be accompanied by a label, as the apparatus may function properly without any labels. Alternately, a legend of symbols that represent the nature of the indicator LED may be attached to the apparatus.

The present embodiment features labels that have been embedded into and below the surface of cover 300. Such embedded labels may be created by stamping or engraving of the labels into the over-molding material. An alternate embodiment may features labels that comprise raised symbols or letters that protrude above the surface of the housing. Such labels may be create during the molding of the housing or otherwise added on. An alternate embodiment may feature the labels that are printed, screened, painted, lithographed or otherwise written onto the surface of the housing. Alternately, the labels may be printed separately and fixed to the surface of the housing.

Cover 300 may also include mounting features, 305$a$-305$d$, such as compression limiters, which extend from the sides of cover 300. A plurality of such mounting features may be arranged substantially perpendicular to the axis of cables 91 and 94.

Figure 8:
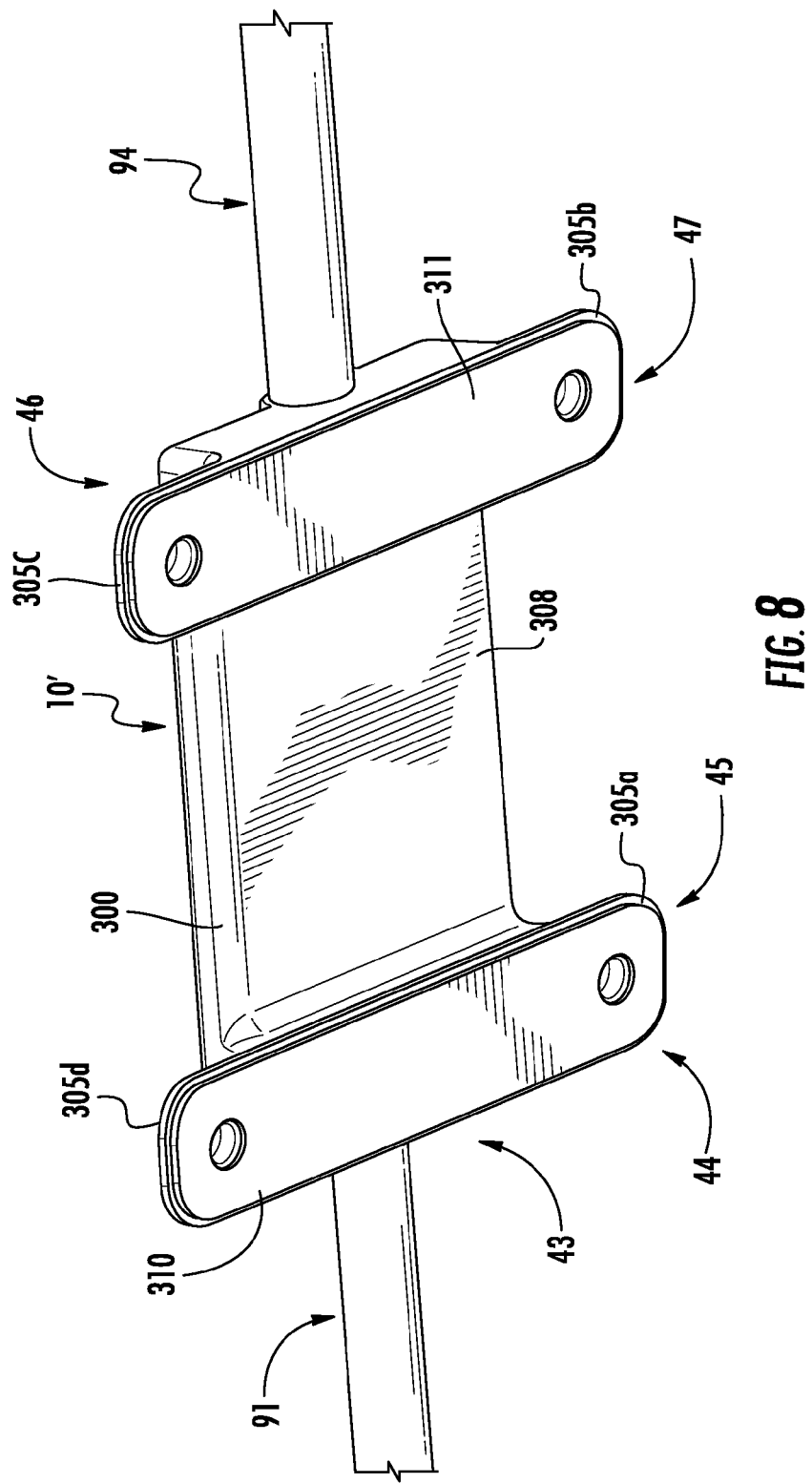
FIG. 8 illustrates a bottom view of current control module having over molding material.

FIG. 8 illustrates an underside 308 of current control module 10'. Underside 308 is the portion which may upon contact and attachment be mounted in direct contact with the vehicle's surface. Mounting surfaces 310 and 311 extend from underside 308 of cover 300. Mounting surface 310 extends beyond the perimeter or sides of cover 300, forming extensions or mounting features 305*a* and 305*d*. In addition, mounting surface 311 extends beyond the perimeter or sides of cover 300, forming extensions or mounting features 305*b* and 305*c*. The mounting surfaces 310 and 311 facilitate the mounting of current control module 10' onto the vehicle body while not compromising the integrity or surface of the enclosed circuit board. Mounting features, 305*a*-305*d* a, may each include a hole for receiving a mounting hardware such as, but not limited to rivets, bolts, screws, and the like. Current control module 10' may contain a means to facilitate mounting to a portion of a vehicle such as, but not limited to, a vehicle panel, engine assembly, frame, hood, lighting assembly and the like. Such means may be holes within case 300 or holes contained partially or wholly within tabs extending from case 300. An alternate embodiment facilitates mounting the apparatus to a vehicle without the aid of mounting hardware. Such mounting may be achieved using tape, an adhesive, a magnet, Velcro, or any other type of substance that would facilitate maintaining contact between the apparatus and the vehicle to which the apparatus was intended to be connected. Mounting without the use of a fastener could occur with or without the use of the extended mounting surface. The apparatus may also function without any locating means.

Figure 9:
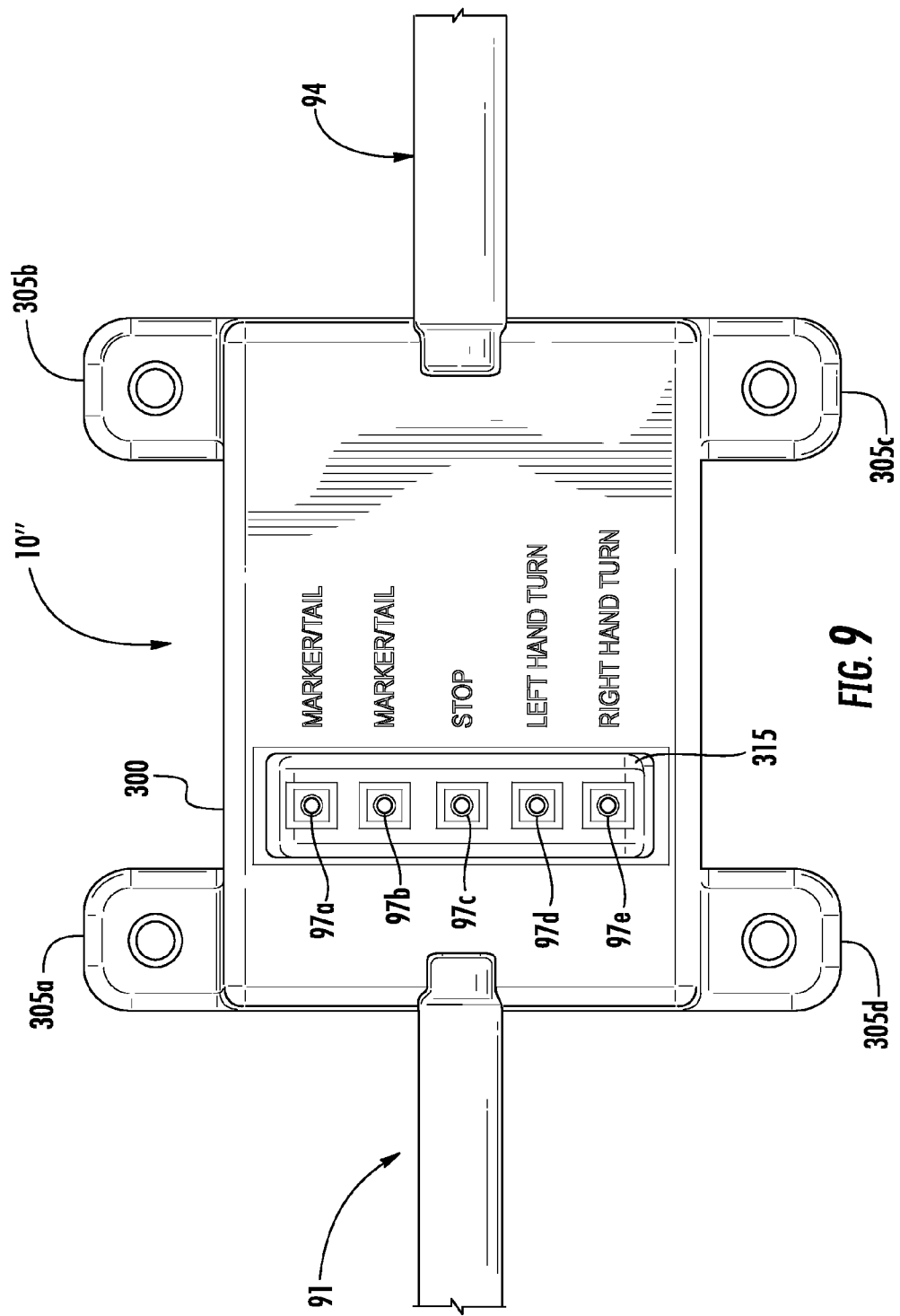
FIG. 9 illustrates a front view of a current control module having over molding material and a transparent lens covering LED indicator lights.

FIG. 9 presents an alternate embodiment of current control module 10" wherein case 300 incorporates a transparent cover or lens 315. Such a cover would serve to be placed over LED indicator lights, 97*a*-97*e*, and attached case 300 so as to act as a barrier between each of LED indicator lights, 97*a*-97*e*, and the outside. Lens or cover 315 also acts to protect LED indicator lights, 97*a*-97*e*, from damage inflicted by contact with harsh road chemicals, environmental weather factors, collision or impact and the like.

LED indicator lights, 97*a*-97*e*, may be incorporated into case 300 using a plurality of locating means. Each individual LED indicator light may be located to be contained wholly or partially within case 300. Alternately, each individual LED indicator light may be inserted so as to be flush with the surface of case 300. Each individual LED indicator light may also protrude from the surface of case 300 such that the LED indicator light extends or projects above the surface of case 300. Transparent lens or cover 315 may be flush with case 300 or protruding from case 300. All individual LED indicator lights may be located using the same locating means or the individual LEDs may each use a different locating means.

Figure 10:
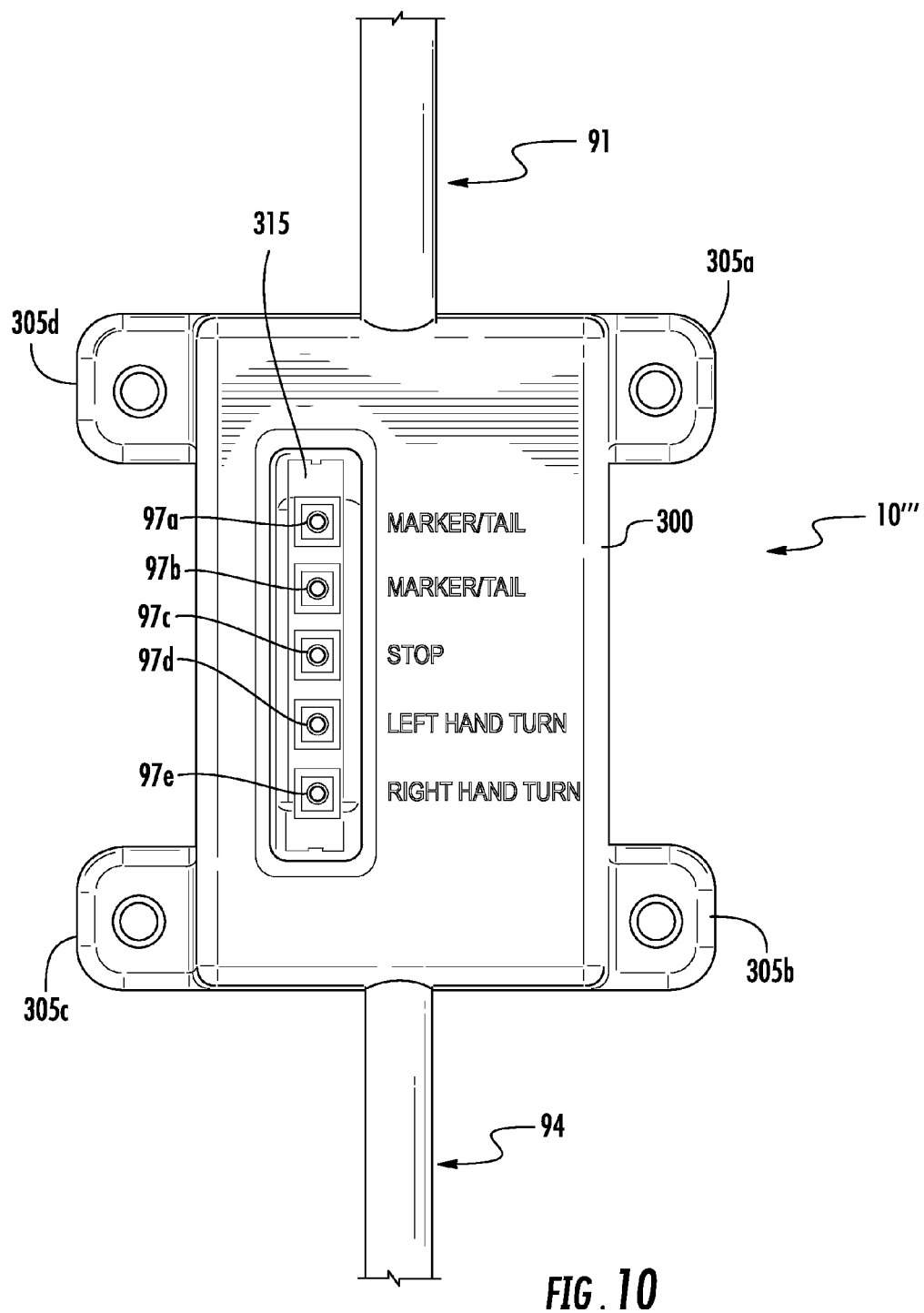
FIG. 10 illustrates a front view of an alternate embodiment of the current control module having over molding material with LED indicator lights.

FIG. 10 presents an alternate embodiment of current control module 10''' wherein LED indicator lights 97*a*-97*e* are located on case 300 and under lens 315 are mounted within the circuitry in a different orientation such that LED indicator lights 97*a*-97*e* are arranged in a column with an axis that runs parallel to cables 91 and 94. This may serve to accommodate different vehicle mounting locations. The labels may also assume an orientation where the letters align perpendicular to cables 91 and 94.

Figure 11:
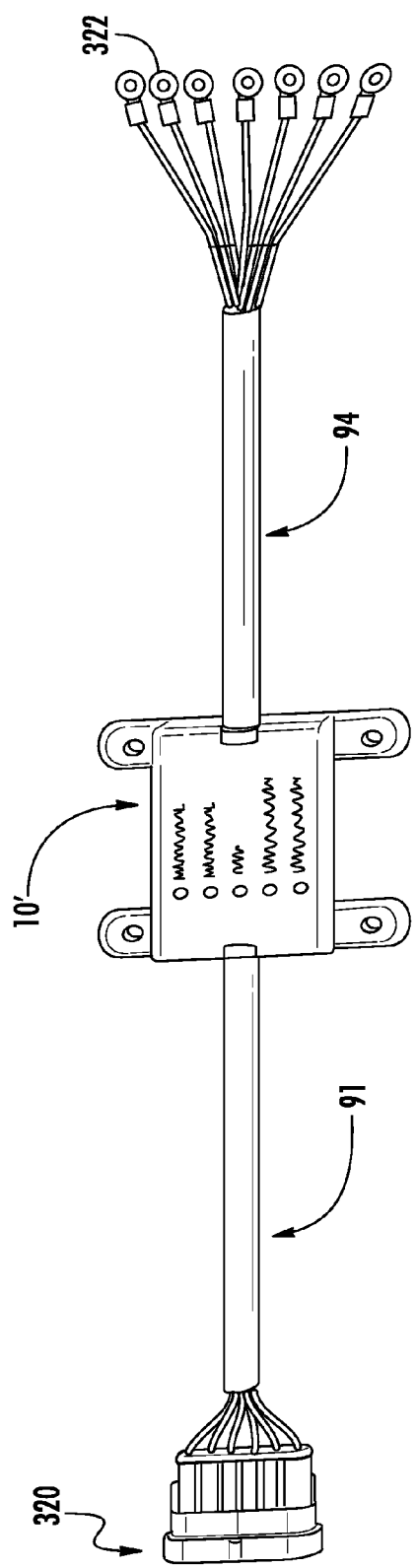
FIG. 11 illustrates a pigtail assembly incorporating a current control module, a power source connection and a lighting apparatus connection.

FIG. 11 presents a pigtail conformation. Cable 91 extends from one side of current control module 10' and includes a common connector 320 that attaches to a standard SAE J560 nose box. Cable 94 extends from another side current control module 10' and includes connecting wires that connects to a power source. Each wire includes a connector 44 for connecting to a power source. Connectors 44 may be any suitable type of connectors, such as spade terminals, including ring-type, fork type or the like, for semi-permanently connecting to the battery terminals, so that, once installed, connectors 44 will not become unintentionally disconnected.

In general, the pigtails (wires and or jacketed cable) coming off of the circuit board are designed to allow easy connection into either a power source or the current control module that provides power to the electrical devices (lamps, switches, etc). Using the pigtail and or connector allows for easy and quick installation and additionally may provide for a sealed connection to the wire harness that will increase the life of the system and decrease corrosion and locations of electrical failures.

Figure 12:
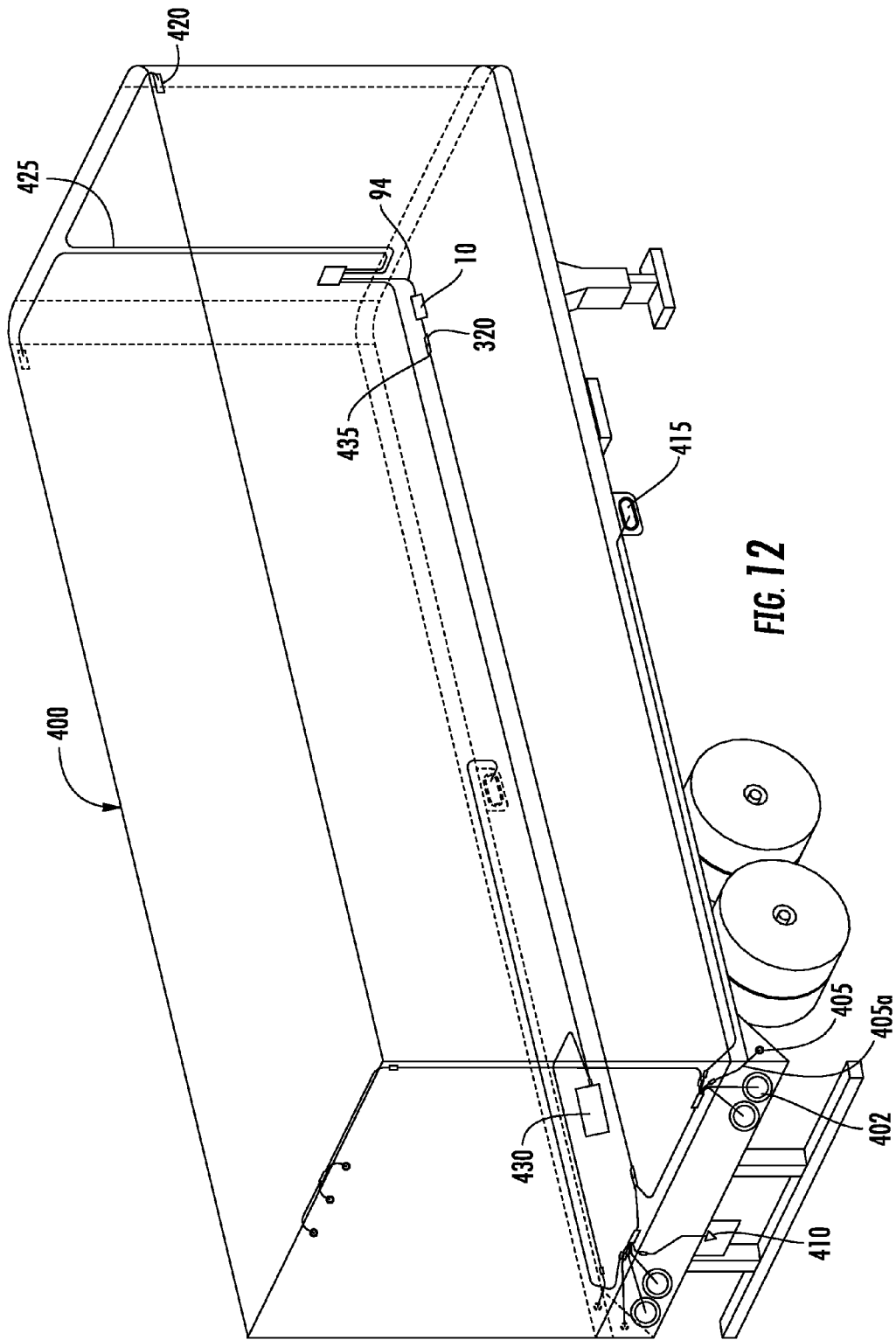
FIG. 12 illustrates a truck trailer having a current control module installed.
Figure 13:
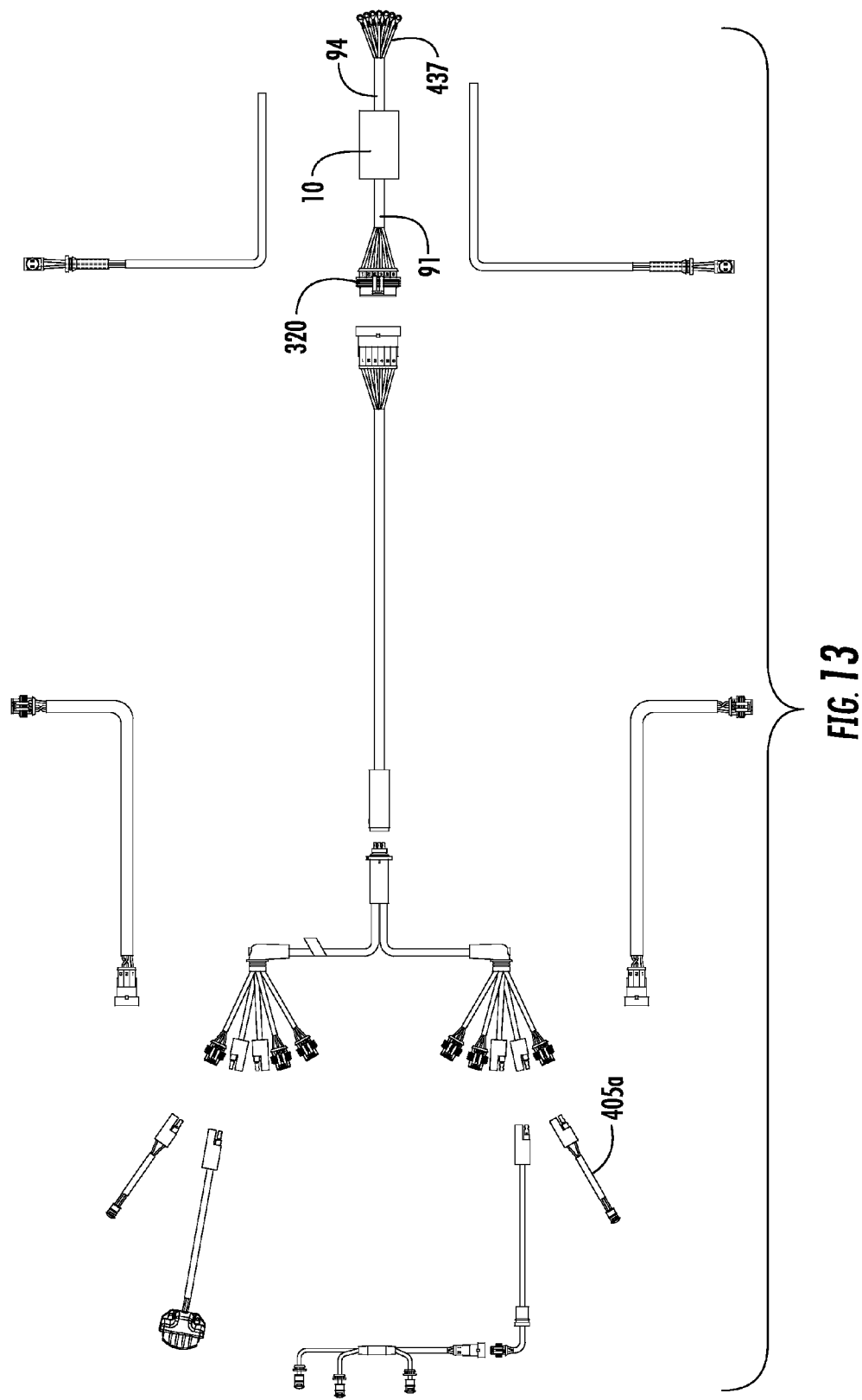
FIG. 13 illustrates an embodiment of a current control module, connectors and lights for a trailer.

FIG. 12 illustrates a truck trailer having a current control module installed. Trailer 400 includes a plurality of lights, such as stop/turn/tail light 402, clearance/marker light or auxiliary light 405, license plate lamp 410, t/s lamp 415, and marker/clearance light 420. A plurality of wires, one of which is indicated at 425, connects the plurality of lights to current control module 10. An electronic control unit 430 is also shown in FIG. 12. FIG. 13 illustrates a current control module, connectors and lights for a trailer. In each of FIGS. 12 and 13, cable 91 extends from one side of current control module 10 and includes a common connector 320 that attaches to a standard SAE J560 nose box 435. Cable 94 extends from another side current control module 10 and includes connecting wires 437 that connect to a power source. The wires shown in FIG. 12 correspond to the wires shown in FIG. 13. For example, wire 405*a* leads to clearance/marker light or auxiliary light 405, as shown in FIG. 12. The remaining wires are similarly connected to corresponding vehicle lights.

Although only exemplary embodiments of the invention have been described above, those skilled, in the art will readily appreciate that many modifications are possible without materially departing from the novel teachings and advantages of this invention. Accordingly, all such modifications are intended to be included, within the scope of this invention as defined in the following claims.

We claim:

1. A current control module for use in a vehicle having a marker or tail lamp, a stop lamp, a left turn signal and a right turn signal, said current control module comprising:
    a circuit board;
    a plurality of wires coupled to the circuit board, each wire of said plurality of wires corresponding to one of said marker or tail lamp, stop lamp, left turn signal or right turn signal;
    a plurality of current monitoring circuits on said circuit board, each one of said plurality of current monitoring circuits corresponding to one wire of said plurality of wires, each current monitoring circuit including:
    a current sense resistor;
    a current sense amplifier for producing an output voltage that is a product of amplifier gain and voltage drop across the current sense resistor;
    a differential voltage comparator for comparing the output voltage to a reference voltage and turning off when the output voltage exceeds the reference voltage;
    a transistor coupled to the differential voltage comparator for turning off and preventing current from being delivered to a corresponding one of said marker or tail lamp, stop lamp, left turn signal or right turn signal.

2. The current control module of claim 1, wherein the reference voltage is configured through a voltage divider resistor network.

3. The current control module of claim 1, further comprising a plurality of indicator lights, each one of said plurality of indicator lights being illuminated when a corresponding differential voltage comparator detects that the output voltage exceeds the reference voltage.

4. The current control module of claim 3, wherein each one of said plurality of indicator lights is illuminated after a predetermined time following when a corresponding differential voltage comparator detects that the output voltage exceeds the reference voltage.

5. The current control module of claim 4, wherein each one of said plurality of indicator lights blinks in a predetermined pattern a corresponding differential voltage comparator detects that the output voltage exceeds the reference voltage.

6. The current control module of claim 1, wherein the circuit board is at least partially over molded with a protective covering.

7. The current control module of claim 6, further including a transparent lens attached to the protective coating for covering said plurality of indicator lights, wherein said plurality of indicator lights is visible through the clear window.

8. The current control module of claim 7, further comprising at least one mounting feature.

9. The current control module of claim 1, wherein the circuit board is completely covered with an over molding material to create a sealed assembly.

10. The current control module of claim 1, wherein the circuit board is at least partially over molded with a protective covering.

11. A current control module for use in a vehicle having a marker or tail lamp, a stop lamp, a left turn signal and a right turn signal, said current control module comprising:
    a circuit board;
    at least one wire coupled to the circuit board, said at least one wire corresponding to one of said marker or tail lamp, stop lamp, left turn signal or right turn signal;
    at least one current monitoring circuit on said circuit board, said at least one current monitoring circuit corresponding to said at least one wire, said current monitoring circuit including:
    a current sense resistor;
    a current sense amplifier for producing an output voltage that is a product of amplifier gain and voltage drop across the current sense resistor;
    a voltage comparator for comparing the output voltage to a reference voltage and turning off when the output voltage exceeds the reference voltage;
    a transistor coupled to the voltage comparator for turning off and preventing current from being delivered to said at least one wire corresponding to one of said marker or tail lamp, stop lamp, left turn signal or right turn signal.

12. The current control module of claim 11, wherein the reference voltage is configured through a voltage divider resistor network.

13. The current control module of claim 11, further comprising at least one indicator light, said at least one indicator light being illuminated when a corresponding voltage comparator detects that the output voltage exceeds the reference voltage.

14. The current control module of claim 13, wherein said at least one indicator light is illuminated after a predetermined time following when a corresponding voltage comparator detects that the output voltage exceeds the reference voltage.

15. The current control module of claim 13, wherein said at least one indicator light blinks in a predetermined pattern a corresponding voltage comparator detects that the output voltage exceeds the reference voltage.

16. The current control module of claim 10, further including a transparent lens attached to the protective coating for covering said at least one indicator light, wherein said at least one indicator light is visible through the transparent lens.

17. The current control module of claim 11, further comprising at least one mounting feature.

18. The current control module of claim 11, wherein the circuit board is completely covered with an over molding material to create a sealed assembly.

19. A method of monitoring electrical current in a vehicle having a marker or tail lamp, a stop lamp, a left turn signal and a right turn signal, said method comprising the steps of:
    receiving an input current from an input wire coupled to a power source;
    measuring a voltage drop across a current sense resistor connected to the input wire;
    measuring a gain of a current sense amplifier attached to the input wire;
    feeding the voltage drop into the current sense amplifier;
    combining the amplifier gain and the voltage drop to produce an amplifier output voltage;
    comparing the amplifier output voltage to a reference voltage with a differential voltage comparator;
    turning off the differential voltage comparator and a transistor when the output voltage exceeds the reference voltage; and
    preventing current from being delivered to a corresponding marker or tail lamp, stop lamp, left turn signal or right turn signal.

20. The method of claim 19, wherein reference voltage is derived by directing the amplifier output voltage through a voltage divider network.

21. The method of claim 20, wherein the voltage divider network is comprised of a plurality of resistors.

22. The method of claim 19 further comprising a step of:
    illuminating an indicator light when said output voltage exceeds the reference voltage.

* * * * *